United States Patent
Longfield et al.

(10) Patent No.: US 10,246,991 B2
(45) Date of Patent: Apr. 2, 2019

(54) ACOUSTIC DETECTION SYSTEM

(71) Applicant: SCHLUMBERGER TECHNOLOGY CORPORATION, Sugar Land, TX (US)

(72) Inventors: Colin Longfield, Paris (FR); Dexter Myles Mootoo, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 383 days.

(21) Appl. No.: 14/218,145

(22) Filed: Mar. 18, 2014

(65) Prior Publication Data

US 2014/0286129 A1    Sep. 25, 2014

Related U.S. Application Data

(60) Provisional application No. 61/803,383, filed on Mar. 19, 2013.

(51) Int. Cl.
| | |
|---|---|
| *G01V 1/40* | (2006.01) |
| *E21B 47/09* | (2012.01) |
| *E21B 47/14* | (2006.01) |
| *G01V 1/22* | (2006.01) |

(52) U.S. Cl.
CPC ............ *E21B 47/091* (2013.01); *E21B 47/14* (2013.01); *G01V 1/22* (2013.01)

(58) Field of Classification Search
CPC .......... E21B 47/091; E21B 47/14; G01V 1/22
USPC ........................................................ 367/33
See application file for complete search history.

(56) References Cited

U.S. PATENT DOCUMENTS

| | | | |
|---|---|---|---|
| 4,915,168 A | 4/1990 | Upchurch | |
| 5,083,452 A * | 1/1992 | Hope | E21B 47/101 73/61.49 |
| 2002/0039328 A1* | 4/2002 | Dubinsky | E21B 47/16 367/82 |
| 2003/0127232 A1 | 7/2003 | Bussear et al. | |
| 2004/0140092 A1* | 7/2004 | Robison | E21B 29/02 166/255.1 |
| 2004/0226720 A1 | 11/2004 | Schultz et al. | |
| 2005/0263279 A1* | 12/2005 | Vachon | E21B 23/006 166/250.01 |
| 2013/0000922 A1* | 1/2013 | Skinner | E21B 34/06 166/373 |

OTHER PUBLICATIONS

International Search Report and Written Opinion issued in the related PCT application PCT/US2014/031156, dated Aug. 6, 2014 (15 pages).
International Preliminary report on patentability issued in the related PCT application PCT/US2014/031156, dated Sep. 22, 2015 (10 pages).

* cited by examiner

*Primary Examiner* — Ian J Lobo

(57) ABSTRACT

A technique facilitates detection of an event in a subterranean environment, e.g. in a wellbore. A tool may be deployed to a desired wellbore location or other subterranean location for actuation between operational positions. An acoustic system also is deployed to detect a unique acoustic signature associated with an event related to operation of the tool. Upon detection of the unique acoustic signature, the acoustic system transmits data to a surface location or other suitable location to indicate occurrence of the event. An example of such an event is transition of the tool between operational positions.

18 Claims, 5 Drawing Sheets

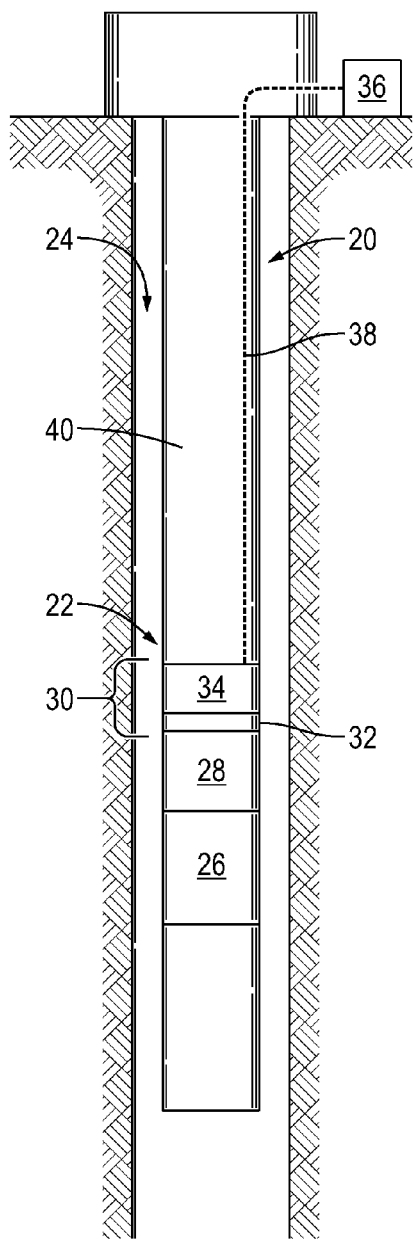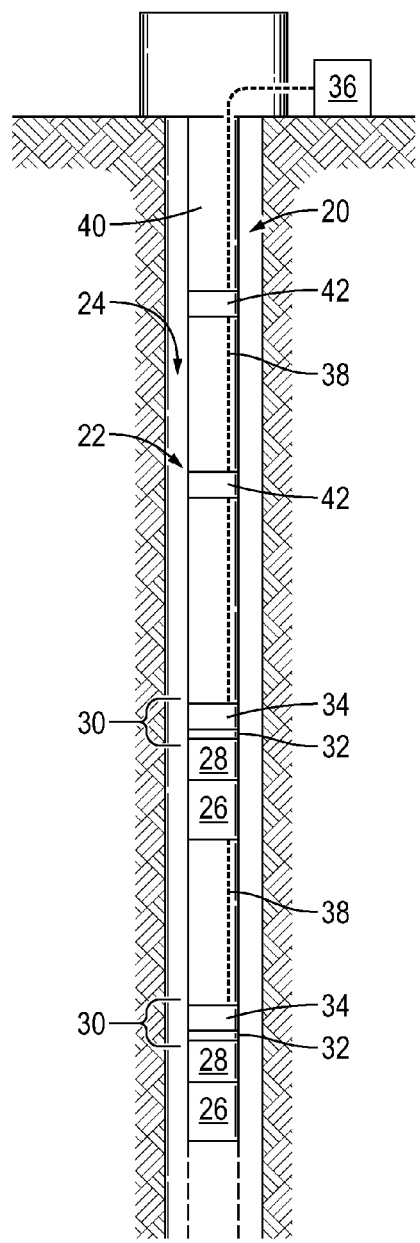

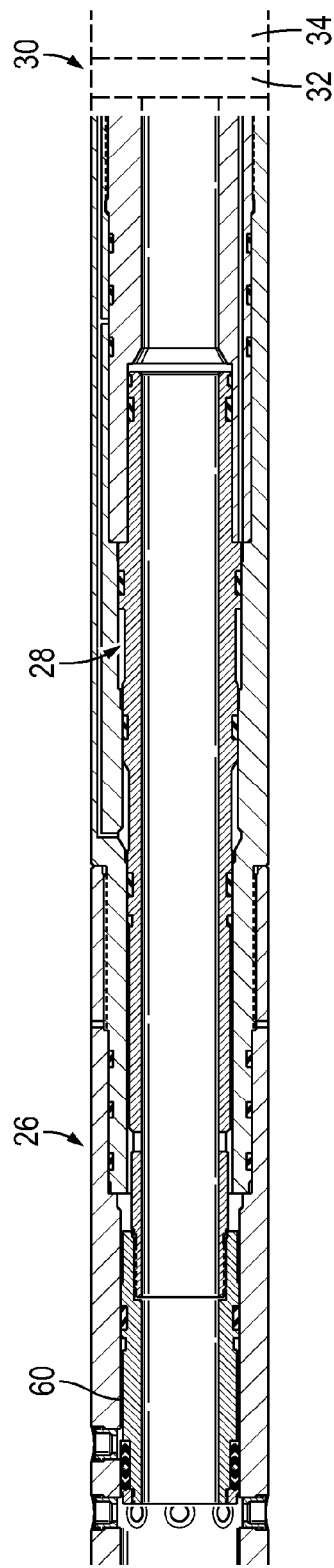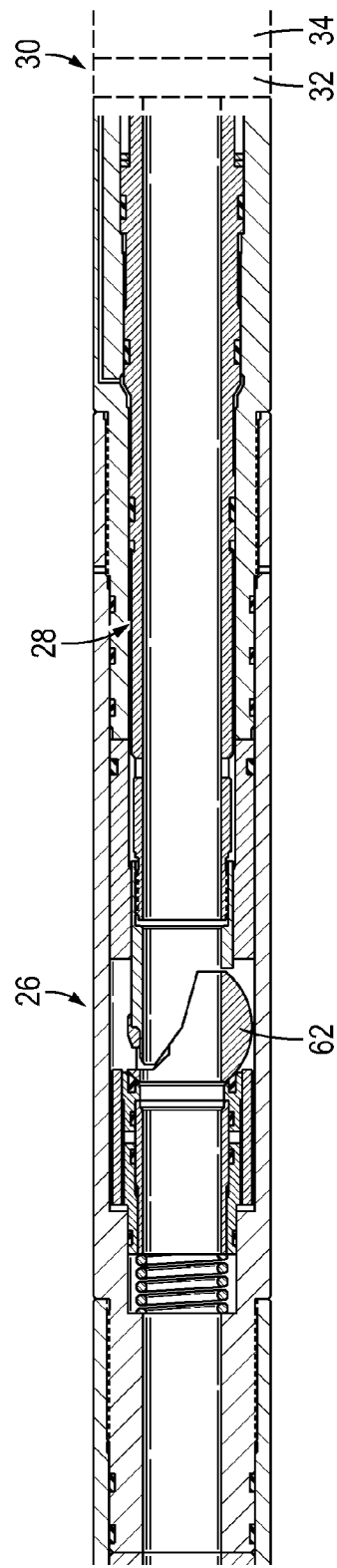

ACOUSTIC DETECTION SYSTEM

CROSS-REFERENCE TO RELATED APPLICATION

The present document is based on and claims priority to U.S. Provisional Application Ser. No. 61/803,383, filed Mar. 19, 2013, incorporated herein by reference in its entirety.

BACKGROUND

Many types of valves and other equipment are utilized in downhole testing and fluid flow applications. Feedback and measurement of valve position can be valuable in ensuring proper performance of the desired downhole operation. For example, detecting and monitoring the position of a valve in a downhole testing and and/or circulating operation can be valuable in ensuring proper completion of the operation. However, technologies available for determining valve position tend to be complex and difficult to use in many downhole environments.

SUMMARY

In general, a system and methodology are provided for detecting an event in a subterranean environment, e.g. in a wellbore. A tool may be deployed to a desired wellbore location or other subterranean location for actuation between operational positions. An acoustic system also is deployed to detect a unique acoustic signature associated with an event related to operation of the tool. Upon detection of the unique acoustic signature, the acoustic system transmits data to a surface location or other suitable location to indicate occurrence of the event, e.g. occurrence of a tool transition between operational positions.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 1 is a schematic illustration of an example of a well system deployed in a wellbore and comprising an acoustic system, according to an embodiment of the disclosure;

FIG. 2 is a schematic illustration of an example of a well system deployed in a wellbore and comprising a plurality of acoustic systems, according to an embodiment of the disclosure;

FIG. 8 is a cross-sectional view of an example of a tool coupled to a tool actuator and working in cooperation with an acoustic system, according to an embodiment of the disclosure; and FIG. 9 is a cross-sectional view of another example of a tool coupled to a tool actuator and working in cooperation with an acoustic system, according to an embodiment of the disclosure.

DETAILED DESCRIPTION

Figure 3:
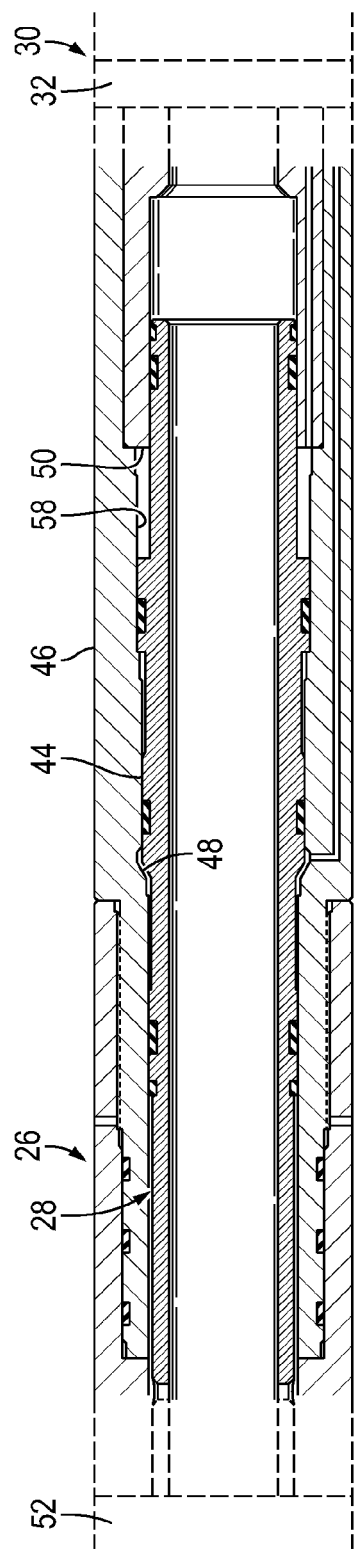
FIG. 3 is a cross-sectional view of an example of a tool actuator coupled with a tool, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for detecting an event in a subterranean environment. For example, the system and methodology may be used to monitor for the occurrence of an event or a plurality of different events in a wellbore. In some applications, a tool may be deployed to a desired wellbore location or other subterranean location. The tool is constructed for actuation between operational positions. By way of example, the tool may comprise a valve shifted between an open position and a closed position. The system and methodology further utilize an acoustic system deployed in the subterranean environment to detect unique acoustic signatures associated with specific events, e.g. events related to operation of the tool. Upon detection of the unique acoustic signature, the acoustic system transmits data to a surface location or other desired location to indicate occurrence of the event, e.g. occurrence of a tool transition between operational positions.

In some embodiments, the acoustic system is utilized with a valve or valves deployed downhole for testing and circulating operations. However, the acoustic system may be used in sand control applications, completions equipment applications, and a variety of downhole or other subterranean applications. The acoustic system also may be used to detect many types of events, including shifting between operational configurations for a variety of tools. Examples of such tools comprise valves, e.g. ball valves, sliding sleeve valves, flapper valves, check valves, and other types of valves which are shifted between open and closed positions or between other operational positions. However, the acoustic system also may be used to detect events associated with other types of tools, including packers, latches, injectors, retrieval tools, landing tools, and/or other types of tools which produce a unique acoustic signature during occurrence of a specific event, e.g. tool actuation.

Referring generally to FIG. 1, an example of a subterranean system 20 is illustrated. In this embodiment, the subterranean system 20 comprises a well system 22 illustrated as disposed in a well, e.g. disposed in a wellbore 24. The well system 22 may comprise a variety of well systems, including completion systems, testing systems, injection systems, and/or other well servicing or production systems.

In the example illustrated, subterranean system 20 comprises a tool 26 and a tool actuator 28. The tool actuator 28 is coupled to tool 26 and designed to actuate the tool 26 between a plurality of operational positions. If, for example, tool 26 comprises a valve, the tool actuator 28 is used to shift the tool/valve 26 between open and closed tool positions. In some applications, the valve or tool 26 may be selectively shifted to additional operational positions, such as intermediate valve positions. The tool actuator 28 may comprise a variety of actuators, including hydraulic actuators, electromechanical actuators, mechanical actuators, or other suitable actuators. In a variety of downhole applications, the tool actuator 28 may comprise a hydraulic piston, as described in greater detail below, which is hydraulically actuated to shift the tool 26 between the different operational positions.

Referring again to FIG. 1, system 20 further comprises an acoustic system 30 which may be used to monitor for unique acoustic signatures associated with a specific event. For example, the acoustic system 30 may be used to detect unique acoustic signatures indicative of tool 26 being shifted to a specific operational position, e.g. a valve closed or valve opened position. The acoustic system 30 comprises a sensor 32, e.g. an accelerometer or hydrophone, oriented to detect the unique acoustic signature or signatures associated with the specific corresponding event or events. For example, the sensor 32 may be oriented to detect the unique acoustic signature associated with movement of the tool actuator 28 and thus shifting of tool 26 to a specific operational position. In some applications, the sensor 32 may comprise a plurality of sensors 32 positioned and oriented to detect the unique acoustic signatures.

The sensor(s) 32 is coupled with electronic circuitry 34 which receives data from the sensor or sensors 32 and relays the data to a control system 36, such as a surface control system, via a communication line 38. The control system 36 may be used to process and display the sensor data in a manner which indicates to an operator the position of tool actuator 28 and tool 26. The electronic circuitry 34 may be in the form of a transceiver able to receive data from each sensor 32 and to relay that data to control system 36. In some applications, the transceiver/electronic circuitry 34 also may be used to relay control signals or other signals from control system 36 to the sensor or sensors 32. By way of example, electronic circuitry 34 may comprise a processor, e.g. a microprocessor, designed to process and relay sensor data. By using a processor, the electronic circuitry 34 may be readily programmed to recognize specific, unique acoustic signatures. In some applications, the data may be processed in whole or in part at surface control system 36. The construction of transceiver/electronic circuitry 34 depends on various parameters, such as the type of acoustic sensor 32, type of communication line 38, and environment in which the acoustic system 30 is deployed.

Depending on the application, communication line 38 may be a wired communication line or a wireless communication line. For example, the communication line 38 may comprise a conductor or other hardwired communication line deployed along a conveyance 40 used to deploy tool 26 downhole into wellbore 24. However, the data from electronic circuitry 34 also may be relayed uphole wirelessly. In some applications, a repeater 42 or a plurality of repeaters 42 may be used to wirelessly transmit the data to control system 36, as in the embodiment illustrated in FIG. 2.

Acoustic system 30 may be designed to both send and receive acoustic signals or other signals. For example, acoustic system 38 may be designed to send and receive control signals from surface control system 36. The acoustic system 38 also may be designed to send and receive acoustic signals to and from other acoustic systems or control systems deployed at subterranean locations, e.g. downhole locations. As further illustrated in the embodiment of FIG. 2, system 20 may comprise a plurality of tools 26 and acoustic systems 30. The overall system 20 may be constructed to enable communication between the electronic circuitry 34 of the plurality of acoustic systems 30. The tools 26, acoustic systems 30, communication lines 38, control system 36, repeaters 42, and/or other components of the overall system may be arranged in a number of configurations to accommodate the parameters of a given acoustic detection application.

Figure 4:
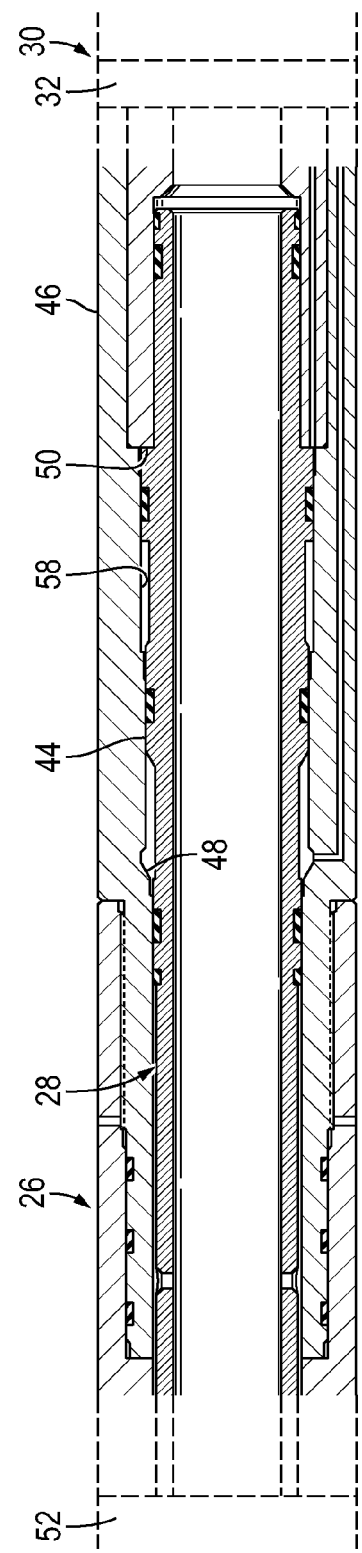
FIG. 4 is a cross-sectional view similar to that of FIG. 3 but showing the tool actuator in a different operational position, according to an embodiment of the disclosure.

Referring generally to FIGS. 3 and 4, an example of tool actuator 28 is illustrated as coupled with tool 26. In this example, tool actuator 28 comprises a piston 44 slidably mounted within a housing 46 of tool 26. The piston 44 may be hydraulically actuated to shift tool 26 between different operational positions. For example, piston 44 may be hydraulically actuated to slide within housing 46 until further movement is blocked by a stop 48, as illustrated in FIG. 3. This movement of piston 44 shifts tool 26 to a first operational position. The piston 44 also may be hydraulically actuated to slide within housing 46 in an opposite direction until further movement is blocked by a stop 50, as illustrated in FIG. 4. The movement of piston 44 in the opposite direction shifts tool 26 to a second operational position. In some applications, tool 26 may comprise a valve 52 shifted between closed and open operational positions, respectively, as piston 44 of tool actuator 28 is actuated between stops 48 and 50.

The movement of tool actuator 28 against stops 48 and 50 produces an acoustic response as piston 44 reaches the end of its stroke and impacts either stop 48 or stop 50 in tool housing 46. The acoustic response at each stop 48, 50 is unique and provides a unique acoustic signature which indicates the specific operational position of tool actuator 28 and thus of tool 26. The acoustic sensor 32 is calibrated to listen for these events, i.e. the unique acoustic signatures produced by impact with stop 48 or with stop 50. Given the different locations, geometries, materials, and/or other unique characteristics of the stops 48, 50, a unique acoustic signature corresponds with each operational position of tool 26. If a plurality of tools 26 is employed, individual or plural acoustic sensors 32 may be positioned and oriented to detect different, unique acoustic signatures received from each of the tools 26.

The unique acoustic signature received by the sensor or sensors 32 is relayed to electronic circuitry 34 which, in some applications, is programmed to recognize and associate the unique acoustic signature with a specific event, e.g. a specific tool operational position. Once the unique acoustic signature is recognized, the information is relayed to surface control system 36 or to another suitable control system as an indication of the tool position. In some applications, the data from sensors 32 may be automatically transmitted to the surface for evaluation and detection of the unique acoustic signatures.

In the example illustrated in FIGS. 3 and 4, the acoustic system 30 may be designed to listen for a specific, temporal event such as the impact with one of the stops 48 or 50. After the tool 26, e.g. valve 52, and tool actuator 28 stop moving, the position detection or interrogation provided by acoustic system 30 is no longer available. However, some systems may be designed to enable acoustic system 30 to perform an ongoing interrogation to detect whether an event has occurred. For example, sensor 32 and acoustic system 38 be calibrated to listen for the unique acoustic signature associated with the fluid flow or lack of fluid flow in "flow" or "no-flow" operational positions of the valve 52. It should be noted that valve 52 may comprise a variety of valve types, including ball valves, flapper valves, sliding sleeve valves, check valves, and/or other types of valves.

In another embodiment, acoustic system 30 may be constructed to interrogate the system repeatedly to determine whether a specific event has occurred. For example, the acoustic system 30 may be designed to perform a periodic or continual frequency scan of its local environment. This type of embodiment may be used with tools 26 having unique resonant frequencies associated with specific tool positions or tool position combinations, e.g. valve positions or valve position combinations. For example, in the case of a dual valve tool the two valves may be placed in four different configurations and each of those configurations as its own natural frequency. When the sensor 32 is activated, the resultant resonant response provides a unique acoustic signature which can be analyzed to discern which of the dual valves is closed or open. The acoustic system 30 and the corresponding sensor or sensors 32 may be activated to provide polling at specific time intervals. In some applications, the acoustic system 30/sensor(s) 32 may be activated after a valve position change command has been executed to confirm the valve position change and to relay the confirmation to surface control system 36. Although a dual valve system has been described, the same approach may be used for dual or multiple tool systems utilizing tools 26 other than valves 52.

Figure 5:
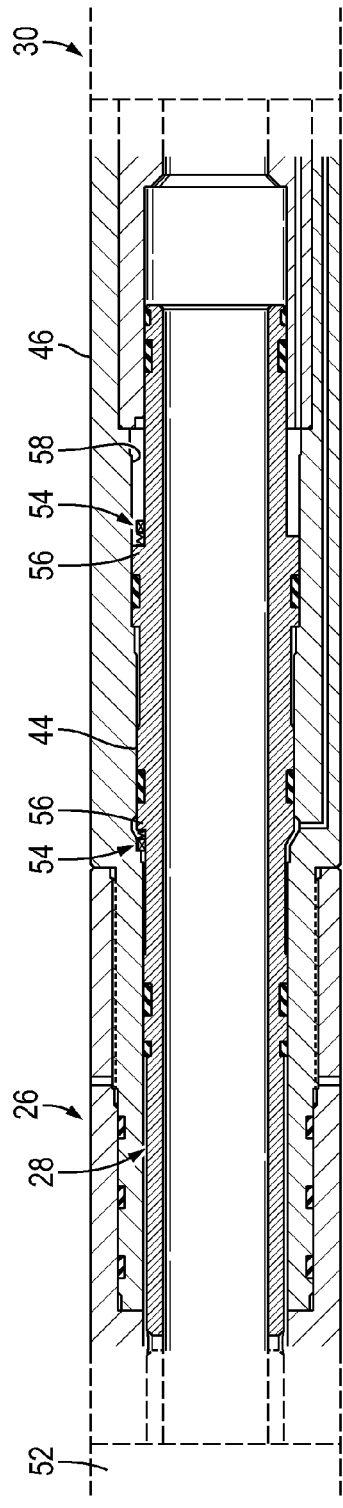
FIG. 5 is a cross-sectional view of another example of a tool actuator, according to an embodiment of the disclosure.
Figure 6:
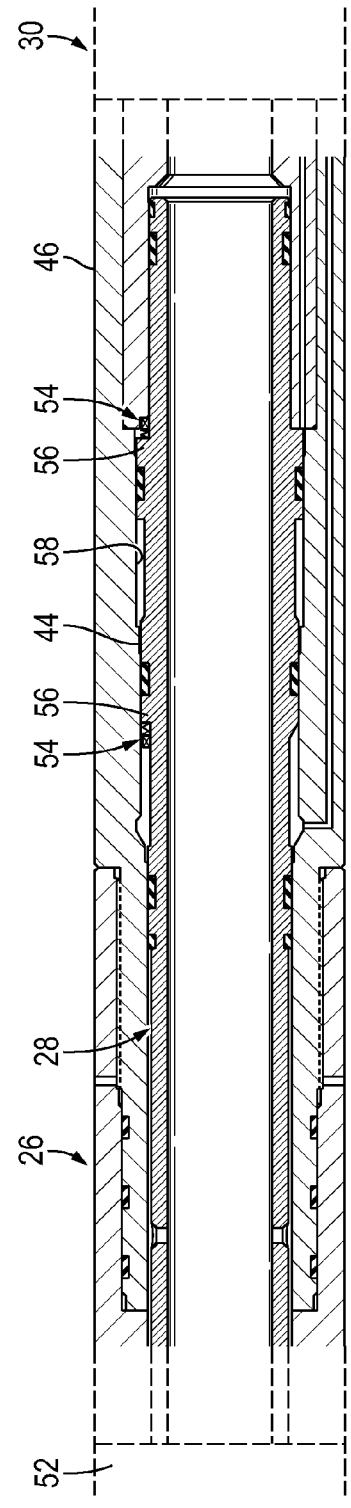
FIG. 6 is a cross-sectional view similar to that of FIG. 5 but showing the tool actuator in a different operational position, according to an embodiment of the disclosure.

Referring generally to FIGS. 5 and 6, the acoustic system 30 also may be used in combination with or may comprise a spring mass resonator 54. In this type of system, the spring mass resonator 54 is tuned to a unique frequency which provides the unique acoustic signature detectable by sensor 32 of acoustic system 30. Depending on the application, an individual spring mass resonator 54 may be used or a plurality, e.g. two, spring mass resonators 54 may be used as illustrated in FIGS. 5 and 6. Each spring mass resonator 54 may be mounted to tool actuator 28. If tool actuator 28 comprises actuator piston 44, for example, a spring mass resonator 54 may be attached to either or both ends 56 of the piston 44. In the embodiments of FIGS. 3-6, piston 44 is received in a hydraulic cylinder region 58 of tool housing 46.

When the tool actuator 28 is actuated to change the operational position of tool 26, one of the spring mass resonators 54 is excited and this excitement provides the unique frequency and thus the unique acoustic signature. The unique acoustic signature is then detected by sensor 32 and discerned or recognized by, for example, electronic circuit 34. If a plurality of the spring mass resonators 54, e.g. two spring mass resonators 54, is used, one of the spring mass resonators 54 may be damped while the other resonates upon shifting to a first tool operational position, as illustrated in FIG. 5. However, when the tool actuator 28 shifts tool 26 to a different or second operational position, then a different spring mass resonator 54 is damped while the other resonates, as illustrated in FIG. 6. The acoustic system 30 is able to recognize the unique frequency/acoustic signature at each of these positions to provide the proper indication of tool operational position. In some applications, there is a finite time interval following actuation during which the free spring mass resonator 54 resonates to provide the unique acoustic signature.

However, the acoustic system 30 may be constructed to provide an excitation signal to the spring mass resonators 54. The excitation signal is able to excite the free spring mass resonator 54 while the other spring mass resonator 54 remains damped. Depending on which spring mass resonator 54 resonates in response to the excitation signal, the acoustic system 30 is able to determine the position of tool actuator 28 and thus also determine the position of tool 26.

Figure 7:
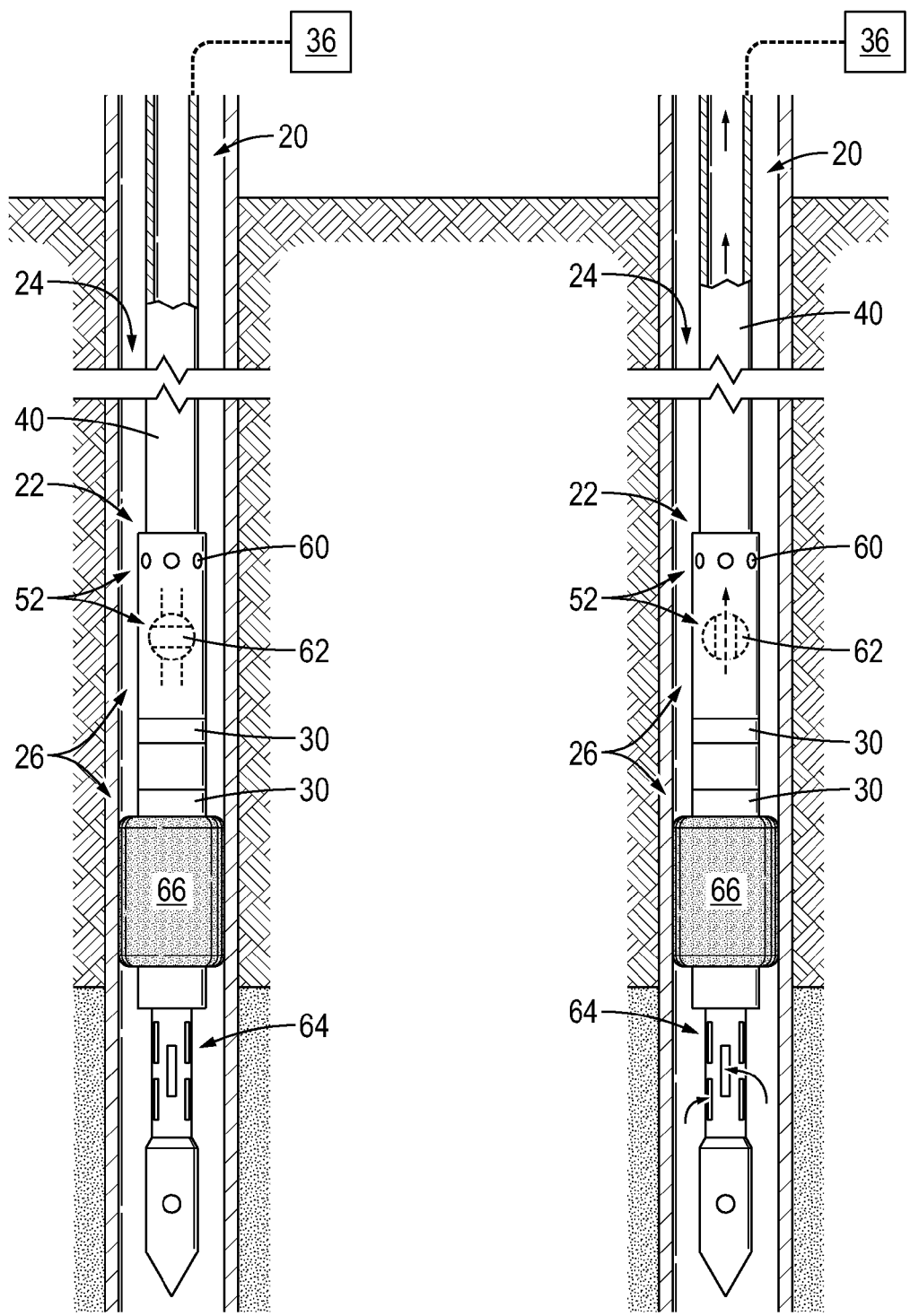
FIG. 7 is an illustration of an example of tools deployed in wellbores and acoustic systems position to detect events associated with operation of the tools, according to an embodiment of the disclosure.

The various acoustic systems 30 described above may be utilized with a variety of tools and well systems. In FIG. 7, for example, individual or plural acoustic system 30 may be utilized with a variety of different types of tools 26 deployed in wellbores 24. Each acoustic system 30 may be associated with each tool 26 or with combinations of tools 26. By way of example, an acoustic system 30 may be used in combination with a dual valve configuration having a pair of valves 52. In this example, one of the valves 52 may comprise a sliding sleeve valve 60 and one of the valves 52 may comprise a flapper valve or a ball valve 62. Examples of a sliding sleeve valve 60 and a ball valve 62 are further illustrated in FIGS. 8 and 9. The valves 60 and 62 are positioned in a tubing string 64 which may comprise a variety of other components, such as a packer 66.

As described above, the electronic circuitry 34 of acoustic system 30 may be programmed or otherwise configured to detect the various operational positions of valves 60 and 62. For example, the embodiment of FIG. 7 illustrates the left wellbore tubing string 64 as having valve 60 in an open position and valve 62 in a closed position while the right wellbore tubing string 64 has valve 60 in a closed position and valve 62 in an open position. Acoustic system 30 detects the unique acoustic signature associated with each of these valve configurations and provides an indication of the valve configuration to an operator via control system 36. The unique acoustic signature in each valve configuration may be created by acoustics associated with stops 48, spring mass resonators 54, fluid flow acoustics, and/or other acoustic devices and/or characteristics.

Instead of the dual valve configuration, an individual acoustic system 38 also may be associated with each individual valve 52. As illustrated in FIGS. 8 and 9, for example, the sliding sleeve valve 60 and the ball valve 62 may each have a dedicated acoustic system 30 configured to detect and determine a unique acoustic signature associated with movement of the corresponding valve and valve actuator between different operational positions. Acoustic systems 30 also may be used with other types of tools, such as packer 66 illustrated in FIG. 7. In this latter example, the acoustic system 30 is programmed or otherwise configured to detect the unique acoustic signature associated with the un-set and set packer to provide an indication of the operational configuration packer 66.

The acoustic system 30 may be used to determine the unique acoustic signature associated with many types of tools employed in many applications. For example, the acoustic system or systems 30 may be used in a variety of well testing applications and other downhole tool applications. The technique enables detection and and recognition of various events, including tool position transitions, e.g. valve position measurements, changes in flow conditions, tool landings, tool latchings, and/or other events producing unique acoustic signatures. The type of acoustic sensor 32 employed to detect the unique acoustic signature may vary depending on the application. In some applications, the acoustic sensor may comprise an accelerometer or a hydrophone but a wide variety of listening devices may be employed to sense the unique acoustic signatures.

In well applications, the acoustic system or systems 30 may be used in cooperation with many types of downhole tools, such as downhole tools included in both upper and lower completion assemblies. For example, acoustic system 30 may be used tubing string 64 to detect tool transitions in valves 52, such as formation isolation valves. Formation isolation valves may be in the form of ball valve 62 and may be used to manage fluid loss, to isolate the well, and/or to facilitate setting of a packer. The ball valve 62 may be shifted hydraulically or mechanically and the acoustic system 30 may be used to confirm whether the ball valve 62 has been opened or closed. Similarly, various combinations of ball valves 62 and sliding sleeve valves 60 may be used in a variety of applications, including flow isolation valve applications. The valve 52 also may comprise a flapper valve used, for example, as a safety valve.

In other well applications, such as sand control operations, the tool 26 may comprise service tools used for sand control and gravel pack operations. Such service tools often incorporate a variety of valves 52, including ball valves, sliding sleeve valves, and flapper valves. The actuation of individual valves 52 or combinations of valves 52 during the sand control operation may be monitored by acoustic system 30. For example, acoustic system 30 may be programmed to perform periodic or continual interrogation of the valves 52 to determine the operational positions of the valves 52 based on the unique acoustic signature provided by spring mass resonators 54 or other suitable mechanisms.

Other examples of sand control operations include positioning a service tool 26 within a lower completion assembly. Load collets and snap latches may be used in cooperation with the acoustic system or systems 30 to facilitate determination of the relative position of the tool 26 within the completion string via unique acoustic signatures associated with operation of the load collets and snap latches. In some applications, the service tool 66 is landed on a no-go collet on the completion string. In other applications, a metal ball can be pumped down and landed on a ball seat to enable the pressure to be increased within the tubing string 64. This pressure can, in turn, be used to shift a sleeve to expose crossover ports through which gravel slurry is conveyed. Other valves, e.g. ball valves, may be operated to facilitate fluid returns back to the surface. One or more acoustic systems 30 may be programmed to recognize the unique acoustic signatures associated with transitioning each of these tools to specific operational positions and/or associated with other events, such as the landing of a tool or ball.

As tubing strings 64, e.g. completion strings, become more complex, the acoustic system 30 provides a simple, efficient technique for tool state determination. The acoustic system 30 may be used to detect a variety of unique acoustic signatures associated with completion of a tool transition to a given operational position. However, the acoustic system 30 also may be programmed or otherwise configured to detect many other types of downhole events based on the unique acoustic signature that results during occurrence of the event and/or upon completion of the event.

The use of unique acoustic signatures to determine the state of equipment may be used in both well and non-well applications. Depending on the parameters of a given application, the acoustic sensor, electronic circuitry (e.g. processor and programming), number of acoustic systems, placement of acoustic systems, and telemetry techniques may vary. Additionally, the tubing strings or other equipment may utilize many types of tools which are selectively shifted between two or more operational positions that each provide a unique acoustic signature. Various types of spring mass resonators, materials, impacts, and other components and features may be utilized to create acoustic signatures that are unique to specific events, e.g. specific tool operational positions. Similarly, individual acoustic systems may be used with single tools or various combinations of tools to detect and recognize acoustic signatures associated with individual tool positions or combinations of tool positions.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a well, comprising:
   a well tool deployed in a wellbore;
   a tool actuator coupled to the well tool, the tool actuator being operable to shift the well tool between a plurality of operational positions;
   a pair of spring mass resonators, mounted to the tool actuator and configured such that when one of the spring mass resonators is excited, the other spring mass resonator of the pair is dampened depending on the position of the tool actuator; and
   an acoustic system deployed downhole into the wellbore, the acoustic system comprising a sensor calibrated to listen for a unique acoustic signature associated with fluid flow depending on the position of the tool actuator, the acoustic system further comprising wireless repeaters positioned within the wellbore to wirelessly transmit data received from the sensor uphole.

2. The system as recited in claim 1, further comprising a surface control system configured to receive data from the at least one of the wireless repeaters.

3. The system as recited in claim 1, wherein the well tool comprises a valve.

4. The system as recited in claim 1, wherein the well tool comprises a ball valve.

5. The system as recited in claim 1, wherein the well tool comprises a sliding sleeve.

6. The system as recited in claim 1, wherein the well tool comprises a packer.

7. The system as recited in claim 1, wherein the well tool comprises a valve, and the plurality of operational positions comprises a valve closed position and a valve opened position.

8. The system as recited in claim 1, wherein the acoustic system is operable to perform frequency scans to detect unique acoustic signatures in the form of unique resonant frequencies indicative of specific tool positions.

9. A method for detecting and communicating event information, comprising:
   actuating a tool, having a pair of spring mass resonators, in a subterranean environment between different operational tool positions wherein when one of the spring mass resonators is excited, the other spring mass resonator of the pair is dampened depending on the position of the tool actuator;
   using an acoustic sensor calibrated to listen for a unique acoustic signature associated with fluid flow corresponding to a specific operational tool position; and
   upon detecting the unique acoustic signature, wirelessly transmitting data from the acoustic sensor to a control system via at least one wireless repeater to provide an indication of the operational tool position.

10. The method as recited in claim 9, wherein actuating comprises actuating the tool in a wellbore.

11. The method as recited in claim 9, wherein actuating comprises actuating a plurality of tools; and using comprises using the acoustic sensor to detect actuation of each tool of the plurality of tools.

12. The method as recited in claim 9, wherein using comprises using the acoustic sensor to detect a plurality of the different operational tool positions based on the unique acoustic signatures resulting from actuation of the tool to each operational tool position.

13. The method as recited in claim 9, wherein actuating comprises actuating a valve; and transmitting comprises transmitting data related to the unique acoustic signature associated with closing the valve.

14. The method as recited in claim 9, wherein actuating comprises actuating a valve; and transmitting comprises transmitting data related to the unique acoustic signature associated with opening the valve.

15. A method for monitoring in a well, comprising:
deploying a tool, having a pair of spring mass resonators, downhole in a well bore;
actuating the tool between operational positions wherein when one of a pair of spring mass resonators is excited, the other spring mass resonator of the pair is dampened depending on the position of the tool actuator;
detecting a unique acoustic signature associated with fluid flow related to operation of the tool; and wirelessly transmitting data to a surface location via repeaters indicating the event detected via the unique acoustic signature.

16. The method as recited in claim 15, wherein deploying comprises deploying a plurality of different tools downhole; and detecting comprises detecting the unique acoustic signature associated with transition of each tool to a specific operational position.

17. The method as recited in claim 15, wherein detecting comprises detecting a unique frequency associated with a spring mass resonator coupled to a tool actuator.

18. The method as recited in claim 15, wherein deploying comprises deploying a valve downhole into the wellbore.

\* \* \* \* \*